(12) United States Patent
Lee et al.

(10) Patent No.: US 11,483,824 B2
(45) Date of Patent: Oct. 25, 2022

(54) WIRELESS BATTERY MANAGEMENT SYSTEM, NODE FOR WIRELESS COMMUNICATION, AND METHOD OF TRANSMITTING DATA

(71) Applicant: SILICON WORKS CO., LTD., Daejeon (KR)

(72) Inventors: Hee Jin Lee, Daejeon (KR); Ki Suk Cho, Daejeon (KR); Kyu Ho Kim, Daejeon (KR); Yong Ju Seon, Daejeon (KR); Jong Chan Kim, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 197 days.

(21) Appl. No.: 16/944,359

(22) Filed: Jul. 31, 2020

(65) Prior Publication Data
US 2021/0045109 A1 Feb. 11, 2021

(30) Foreign Application Priority Data
Aug. 5, 2019 (KR) .................. 10-2019-0095221
Jul. 6, 2020 (KR) .................. 10-2020-0082670

(51) Int. Cl.
*H04L 12/28* (2006.01)
*H04W 72/04* (2009.01)
*H04J 1/16* (2006.01)

(52) U.S. Cl.
CPC ... *H04W 72/0446* (2013.01); *H04W 72/0453* (2013.01)

(58) Field of Classification Search
CPC .......... H01M 2010/4278; H04W 8/24; H04W 72/0446; H04W 72/0453
USPC .................. 370/252, 329, 386, 430, 442
See application file for complete search history.

(56) References Cited

U.S. PATENT DOCUMENTS

| | | | |
|---|---|---|---|
| 2004/0032853 A1 | 2/2004 | D'Amico et al. | |
| 2008/0151801 A1* | 6/2008 | Mizuta | H04W 52/46 370/311 |
| 2016/0164726 A1* | 6/2016 | Fraser | H04W 72/0453 370/254 |
| 2016/0325626 A1* | 11/2016 | Honda | G01R 31/385 |

FOREIGN PATENT DOCUMENTS

KR 10-2014-0072733 A 6/2014

\* cited by examiner

*Primary Examiner* — John Pezzlo
(74) *Attorney, Agent, or Firm* — Harness, Dickey & Pierce, P.L.C.

(57) ABSTRACT

The present disclosure relates to a wireless battery management system, and more particularly, to a wireless battery management system, a node for wireless communication, and a method of transmitting data, which ensure stability and efficiency when obtaining battery data through wireless communication. A wireless battery management system includes a manager node obtaining battery data from a plurality of monitor nodes by using a first channel and a second channel which are communication channels based on wireless communication, a first monitor node collecting first battery data and transmitting the first battery data to the manager node through the first channel during a first dedicated slot, and a second monitor node collecting second battery data and transmitting the second battery data to the manager node through the second channel during the first dedicated slot.

15 Claims, 15 Drawing Sheets

WIRELESS BATTERY MANAGEMENT SYSTEM, NODE FOR WIRELESS COMMUNICATION, AND METHOD OF TRANSMITTING DATA

CROSS-REFERENCE TO RELATED APPLICATIONS

This application claims the benefit of the Korean Patent Application No. 10-2019-0095221 filed on Aug. 5, 2019 and 10-2020-0082670 filed on Jul. 6, 2020, which is hereby incorporated by reference as if fully set forth herein.

FIELD

The present disclosure relates to a wireless battery management system, and more particularly, to a wireless battery management system, a node for wireless communication, and a method of transmitting data, which ensure stability and efficiency when obtaining battery data through wireless communication.

BACKGROUND

As the demand for portable electronic products such as notebook computers, video cameras, and portable phones increases rapidly and electric vehicles, storage batteries for storing energy, robots, and satellites are really developed, research on high-performance batteries capable of being repeatedly charged and discharged is being actively done.

A minimum unit of each battery may be referred to as a battery cell, and a plurality of battery cells serially connected to one another may configure a battery module. Also, a plurality of battery modules may be connected to one another in series or parallel, and thus, may configure a battery pack.

Generally, a battery pack equipped in electric vehicles and the like includes a plurality of battery modules connected to one another in series or parallel. The battery pack includes a battery management system which monitors a state of each of the battery modules and executes a control operation corresponding to the monitored state.

The battery management system includes a controller for obtaining and analyzing battery data. However, each of the battery modules included in the battery pack includes a plurality of battery cells, and due to this, there is a limitation in monitoring states of all of the battery cells included in the battery pack by using a single controller. Therefore, a method, where a controller is equipped in each of a certain number of battery modules included in a battery pack, one of the controllers is set as a master, and the other controllers are set as slaves, is being recently used for distributing a load of a controller and quickly and accurately monitoring a whole state of a battery pack.

A slave controller equipped in each of a certain number of battery modules is connected to a master controller over a wired communication network such as a control area network (CAN), collects battery data of a battery module controlled by the slave controller, and transmits the battery data to the master controller.

Technology, which sets a short-range wireless channel between the master controller and the slave controller and performs short-range wireless communication between the master controller and the slave controller, has been proposed for preventing the non-efficiency of a space occurring in a case where the CAN is built for communication between the master controller and the slave controller However, like interference, the degradation in wireless signals, and a collision between the wireless signals, a case where wireless communication is unstable occurs frequently in a short-range wireless communication environment. In such a case where a state of a wireless communication channel is unstable, a situation where the master controller cannot obtain battery data from the slave controller or cannot control the slave controller at an appropriate time occurs, causing a problem where the total quality of a battery pack is degraded.

SUMMARY

Accordingly, the present disclosure is directed to providing a wireless battery management system, a node for wireless communication, and a method of transmitting data that substantially obviate one or more problems due to limitations and disadvantages of the related art.

An aspect of the present disclosure is directed to providing a wireless battery management system, a node for wireless communication, and a method of transmitting data, which support stable communication between a manager node set as a master node and a monitor node set as a slave node in a wireless communication environment.

Another aspect of the present disclosure is directed to providing a wireless battery management system, a node for wireless communication, and a method of transmitting data, which increase the availability of a wireless channel.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a wireless battery management system including: a manager node obtaining battery data from a plurality of monitor nodes by using a first channel and a second channel which are communication channels based on wireless communication; a first monitor node collecting first battery data and transmitting the first battery data to the manager node through the first channel during a first dedicated slot; and a second monitor node collecting second battery data and transmitting the second battery data to the manager node through the second channel during the first dedicated slot.

In another aspect of the present disclosure, there is provided a manager node including: a first wireless communication unit having a communication channel set to a first channel based on a first frequency; a second wireless communication unit having a communication channel set to a second channel based on a second frequency; and a manager controller receiving first battery data from the first monitor node by using the first wireless communication unit and receiving second battery data from the second monitor node by using the second wireless communication unit, during a first dedicated slot shared by a first monitor node and a second monitor node.

In another aspect of the present disclosure, there is provided a monitor node sharing a dedicated slot with another monitor node, the monitor node including: a wireless communication unit performing wireless communication with a manager node; an interface connected to a battery module; and a monitor controller collecting battery data by using the interface, setting a communication channel of the wireless communication unit to a first channel differing from a communication channel of another monitor node during a first dedicated slot shared by the another monitor node, and transmitting the battery data to the manager node through the first channel.

In another aspect of the present disclosure, there is provided a method of transmitting battery data in a wireless battery management system, the method including: allowing a first monitor node and a second monitor node to share a plurality of dedicated slots; and during an $N^{th}$ (where N is a natural number) dedicated slot, transmitting first battery data to a manager node through a first channel by using the first monitor node and transmitting second battery data to the manager node through a second channel by using the second monitor node.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
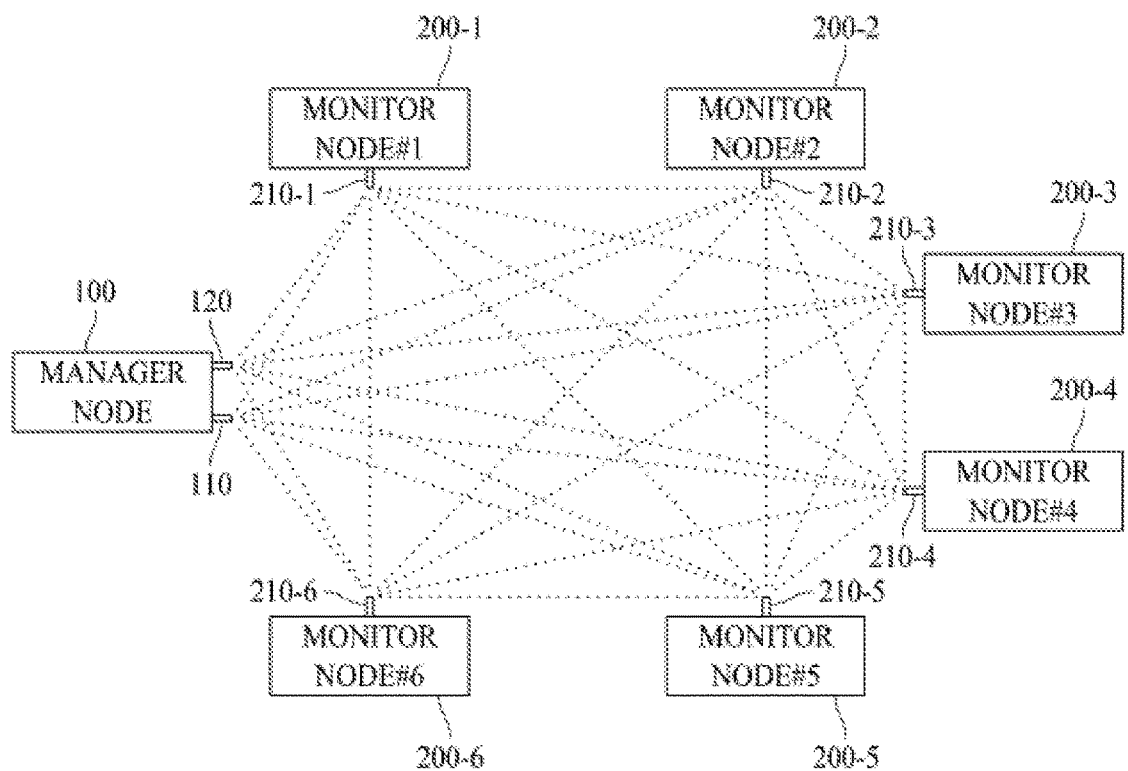
FIG. 1 is a diagram illustrating a wireless battery management system according to an embodiment of the present disclosure.

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

FIG. 1 is a diagram illustrating a wireless battery management system according to an embodiment of the present disclosure.

As illustrated in FIG. 1, the wireless battery management system according to an embodiment of the present disclosure may include a manager node 100 and a plurality of monitor nodes 200-N, and the manager node 100 and each of the monitor nodes 200-N may perform wireless communication therebetween.

In the wireless battery management system according to an embodiment, the manager node 100 may include a controller set as a master controller, and each of the monitor nodes 200-N may include a controller set as a slave controller.

In an embodiment, the manager node 100 and each of the monitor nodes 200-N may perform wireless communication therebetween according to a short-range wireless communication protocol based on IEEE 802.15.4+. In another embodiment, the manager node 100 and each of the monitor nodes 200-N may perform wireless communication therebetween according to a protocol based on one of IEEE 802.11, IEEE 802.15, and IEEE 802.15.4, or may perform wireless communication therebetween according to a short-range wireless protocol based on another scheme.

Each of the monitor nodes 200-N may be equipped in one or more battery modules each including a set of cells and may collect battery data including a voltage, a current, a temperature, humidity, and the like occurring in the battery module. Also, each of the monitor nodes 200-N may autonomously inspect a state of a battery module equipped with a corresponding monitor node by measuring an analog front end (AFE) of the battery module and inspecting a state (i.e., diagnostic test) of the battery module, thereby generating a self-diagnosis data including an inspection result.

The manager node 100 may receive battery data, including one or more of a current, a voltage, a temperature, and self-diagnosis data, from each of the monitor nodes 200-N and may analyze the received battery data to monitor a state of each battery module or a state of a battery pack. The manager node 100 may analyze data of each battery module received from each of the monitor nodes 200-N to estimate the state (for example, state of charge (SOC) and state of health (SOH)) of each battery module and a whole state of the battery pack.

According to an embodiment of the present disclosure, the manager node 100 may include two or more wireless communication units (for example, first and second wireless communication units) 110 and 120. The wireless communication units 110 and 120 may each include a circuit and an antenna, for performing short-range wireless communication. The wireless communication units 110 and 120 may be set to different communication channels in the manager node 100. For example, the first wireless communication unit 110 may be set to a first channel based on a first frequency, and the second wireless communication unit 120 may be set to a second channel based on a second frequency.

The manager node 100 may simultaneously receive a plurality of battery data from a pair of monitor nodes 200-N by using the first wireless communication unit 110 and the second wireless communication unit 120. For example, the manager node 100 may receive first battery data from a monitor node #1 200-1 by using the first wireless communication unit 110 and may receive second battery data from a monitor node #2 200-2 by using the second wireless communication unit 120, at a specific timing (i.e., a dedicated slot). Also, when the manager node 100 fails in receiving battery data by using the first channel and the second channel, the manager node 100 may change a communication channel of the first wireless communication unit 110 to a third channel, or may change a communication channel of the second wireless communication unit 120 to a fourth channel. Here, a channel may represent a wireless communication path, and wireless communication units 110, 120, and 210-N may each be set to one of a plurality of channels. A wireless communication unit being set to a specific channel may denote that each of the wireless communication units 110, 120, and 210-N is set to a communication frequency corresponding to the specific channel. Channels may have different frequencies. A frequency of the first channel and a frequency of the second channel may be set to be apart from each other by a predetermined frequency value or more, based on interference therebetween.

The manager node 100 and each of the monitor nodes 200-N may communicate with each other by using a data frame having a predefined format. The manager node 100 may transmit a beacon, placed at a first portion of the data frame, to each of the monitor nodes 200-N to synchronize a slot timing included in the data frame.

Figure 2:
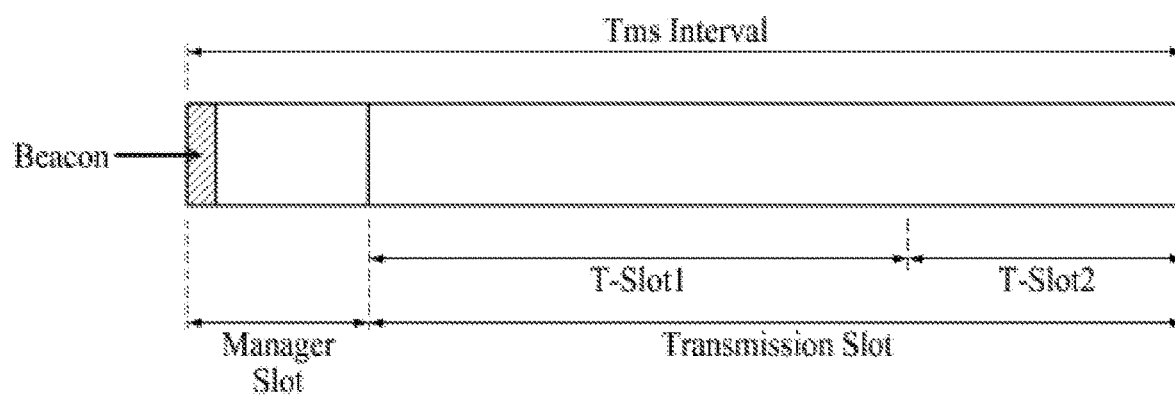
FIG. 2 is a diagram illustrating a data frame according to an embodiment of the present disclosure.

FIG. 2 is a diagram illustrating a data frame according to an embodiment of the present disclosure.

Referring to FIG. 2, a data frame used for wireless communication according to the present disclosure may include a plurality of time slots including a manager slot and a transmission slot and may have a certain time length Tms. A predetermined time section may be allocated to the manager slot and the transmission slot of the data frame, and an arrangement order of the manager slot and the transmission slot may be constant. In the data frame, a first-arranged manager slot may be a dedicated slot used for the manager node 100 and may include a beacon. The beacon may perform a function of notifying the start of the data frame, and thus, may synchronize a slot timing. The manager node 100 may continuously transmit the beacon at a certain periodic interval. The manager node 100 may transmit the beacon through each of a primary channel and a secondary channel.

Each of the monitor nodes 200-N may recognize a start time of the data frame on the basis of the beacon and may extract the manager slot and the transmission slot each having a previously-allocated time from the data frame on the basis of the beacon.

In the data frame, a manager slot may be a slot which is used for the manager node 100 to control the monitor node 200-N.

The transmission slot may be a period where data of each monitor node 200-N is transmitted and may be a dedicated slot for each monitor node 200-N. The transmission slot may be divided into a first sub transmission slot T-Slot1 and a second sub transmission slot T-Slot2. The first sub transmission slot T-Slot1 may have a time length which is longer than that of the second sub transmission slot T-Slot2, or the first sub transmission slot T-Slot1 and the second sub transmission slot T-Slot2 may have the same time length.

The first sub transmission slot T-Slot1 may be a period where the first channel of the first wireless communication unit 110 and the second channel of the second wireless communication unit 120 are used and may be divided into a plurality of dedicated slots. Also, the second sub transmission slot T-Slot2 may be a period where one or more of a third channel of the first wireless communication unit 110 and a fourth channel of the second wireless communication unit 120 are used and may be divided into a plurality of dedicated slots.

Each of the monitor nodes 200-N may include one wireless communication unit 210-N and may communicate with the manager node 100 and a peripheral monitor node 200-N by using the wireless communication unit 210-N. Each of the monitor nodes 200-N may collect battery data including one or more of a self-diagnosis result and sensing information (for example, a temperature, humidity, a voltage, a current, etc.) about one or more battery modules equipped with a corresponding monitor node and may report the battery data to the manager node 100, based on control by the manager node 100.

The monitor node 200-N may set one of the first channel and the second channel to a main communication channel and may transmit battery data to the manager node 100 by preferentially using a channel set to the main communication channel. The monitor node 200-N may set a channel, used in a first dedicated slot among a plurality of dedicated slots assigned thereto, to the main communication channel. When the monitor node 200-N fails in transmitting the battery data by using the main communication channel, the monitor node 200-N may retransmit the battery data to the manager node 100 by using another channel. For example, when the monitor node 200-N fails in transmitting the battery data by using the other channel, the monitor node 200-N may change a currently-set communication channel to another channel and may again retransmit the battery data to the manager node 100.

Figure 3:
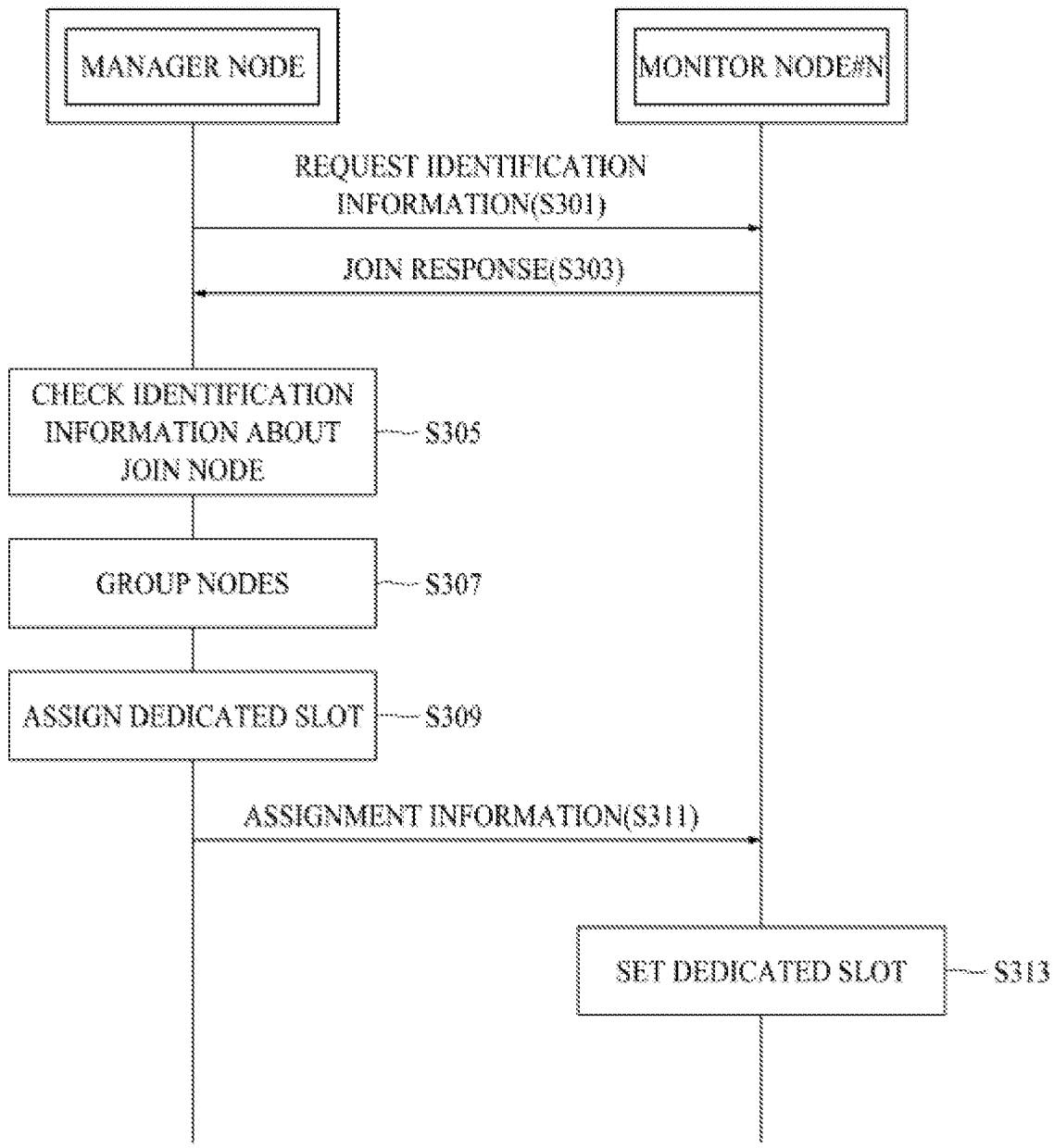
FIG. 3 is a flowchart describing a method of assigning a dedicated slot in a wireless battery management system, according to an embodiment of the present disclosure.

FIG. 3 is a flowchart describing a method of assigning a dedicated slot in a wireless battery management system, according to an embodiment of the present disclosure.

Referring to FIG. 3, when power is turned on or a network is formed, a manager node 100 may broadcast a message, requesting identification information and issuing a request to join in the network, on the basis of short-range wireless communication so as to allow peripheral monitor nodes 200-N to join in a short-range wireless network in operation S301. The manager node 100 may transmit the message during a manager slot of a data frame.

Subsequently, when each monitor node 200-N receives the message, each monitor node 200-N may transmit a join response including its own identification information (for example, an MAC address) to the manager node 100 in operation S303. In this case, in order to prevent a response collision, each monitor node 200-N may transmit the join response including its own identification information to the manager node 100 at a time when another monitor node 200-N does not transmit a response, based on carrier sense multiple access with collision avoidance (CSMA-CA) technology.

Subsequently, the manager node 100 may check identification information about each monitor node 200-N which has received the join response and may count the number of monitor nodes 200-N to check the number of monitor nodes 200-N joining in the short-range wireless network in operation S305. Subsequently, in operation S307, the manager node 100 may group monitor nodes into a plurality of groups so as to generate groups including a number of elements equal to a certain number (for example, two). Also, when fewer monitor nodes than the certain number remain and are not included in a group, the manager node 100 may generate a group so that the remaining monitor nodes are included in one group. The manager node 100 may set the number of wireless communication units 110 and 120 to the number of elements. Also, the manager node 100 may group monitor nodes 200-N into a plurality of groups randomly or in the order in which join responses are received. For example, as in FIG. 1, in a case where six monitor nodes join in the short-range wireless network, the manager node 100 may set a monitor node #1 200-1 and a monitor node #2 200-2 to a first group, a monitor node #3 200-3 and a monitor node #4 200-4 to a second group, and a monitor node #5 200-5 and a monitor node #6 200-6 to a third group.

Subsequently, in operation S309, the manager node 100 may assign a plurality of dedicated slots for each group. In detail, the manager node 100 may equally divide the first sub transmission slot T-Slot1 into slots equal to a group*N number and may respectively assign the divided transmission slots to groups, and moreover, may equally divide the second sub transmission slot T-Slot2 into slots equal to a group*N number and may respectively assign the divided transmission slots to groups. Also, the manager node 100 may equally assign dedicated slots of a specific group to monitor nodes 200-N included in a corresponding group, and thus, may allow the dedicated slots to be shared by monitor nodes of the same group. Also, the manager node 100 may generate channel setting information about each dedicated slot. The channel setting information may include channel identification information which is used during a dedicated slot, and the manager node 100 may generate the channel setting information so that nodes of the same group use different channels during a dedicated slot shared by the nodes. Subsequently, in operation S311, the manager node 100 may generate assignment information including information (for example, a start point and an end point) about a dedicated slot assigned to a monitor node 200-N and the channel setting information about each dedicated slot, for each monitor node 200-N and may transmit the assignment information to a corresponding monitor node 200-N.

Subsequently, in operation S313, the monitor node 200-N may check each dedicated slot information and channel setting information among the assignment information to set a plurality of periods, corresponding to the dedicated slot information, of a transmission slot of a data frame to a dedicated slot, and moreover, may check a channel used for each dedicated slot on the basis of the channel setting information. For example, each monitor node 200-N may set a plurality of dedicated slots illustrated in FIG. 4 on the basis of the assignment information received from the manager node 100 and may check a channel used for each dedicated slot. Each monitor node 200-N may check identification information about a channel used during a first-sequence dedicated slot among the assignment information and may set the wireless communication unit 210-N to correspond to the identification information about the channel.

Figure 4:
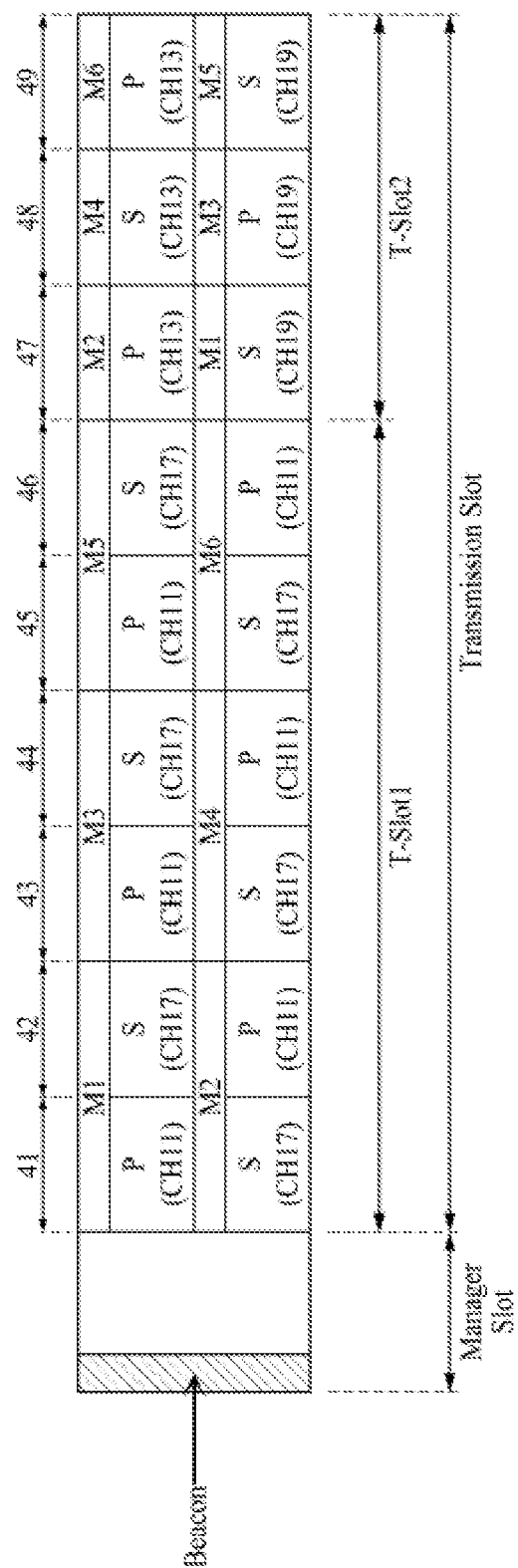
FIG. 4 is an example of a data frame with a dedicated slot assigned thereto.

FIG. 4 is an example of a data frame with a dedicated slot assigned thereto.

"M" illustrated in FIGS. 4, 5, and 7 to 10 may represent a monitor node, "P" may represent a wireless communication path for communicating with a first wireless communication unit 110 of a manager node 100, and "S" may represent a wireless communication path for communicating with a second wireless communication unit 120 of a manager node 100. Also, "CHn" in parentheses may represent channel identification information, and in an embodiment of the present disclosure, a first channel may be referred to by "CH11", a second channel may be referred to by "CH17", a third channel may be referred to by "CH13", and a fourth channel may be referred to by "CH19". Also, it is described that a first group includes a monitor node #1 M1 200-1 and a monitor node #2 M2 200-2, a second group includes a monitor node #3 M3 200-3 and a monitor node #4 M4 200-4, and a third group includes a monitor node #5 M5 200-5 and a monitor node #6 M6 200-6.

When the number of groups is three and the number of wireless communication units 110 and 120 equipped therein is two, as illustrated in FIG. 4, the manager node 100 may set assign a dedicated slot and may set a channel. That is, the manager node 100 may divide a first sub transmission slot T-Slot1 into a plurality of slots to generate a plurality of dedicated slots (for example, first to sixth dedicated slots) 41 to 46, assign the first dedicated slot 41 and the second dedicated slot 42 to a first group, assign the third dedicated slot 43 and the fourth dedicated slot 44 to a second group, and assign the fifth dedicated slot 45 and the sixth dedicated slot 46 to a third group. The manager node 100 may use a result, obtained by multiplying the number (i.e., three) of groups and the number (i.e., two) of wireless communication units 110 and 120, as the number of divisions of the first sub transmission slot T-Slot1. Also, the manager node 100 may equally divide a second sub transmission slot T-Slot2 into slots equal to the number of groups to generate a plurality of dedicated slots (for example, seventh to ninth dedicated slots) 47 to 49, assign the seventh dedicated slot 47 to a first group, assign the eighth dedicated slot 48 to a second group, and assign the ninth dedicated slot 49 to a third group.

Monitor nodes included in the same group may be set to communicate with different wireless communication units 110 and 120 during a dedicated slot shared by the monitor nodes. To this end, the manager node 100 may generate channel setting information about each monitor node so that one of monitor nodes 200-N included in the same group communicates with the first wireless communication unit 110 during a specific dedicated slot and the other monitor node 200-N communicates with the second wireless communication unit 120 during the specific dedicated slot.

Referring to FIG. 4, during the first dedicated slot 41, a first monitor node 200-1 may communicate with the first wireless communication unit 110 of the manager node 100 through the first channel CH11, and a second monitor node 200-2 may communicate with the second wireless communication unit 120 of the manager node 100 through the second channel CH17. Also, during the second dedicated slot 42, the first monitor node 200-1 may communicate with the second wireless communication unit 120 of the manager node 100 through the second channel CH17, and the second monitor node 200-2 may communicate with the first wireless communication unit 110 of the manager node 100 through the first channel CH11. As another example, during the third dedicated slot 43, a third monitor node 200-3 may communicate with the first wireless communication unit 110 of the manager node 100 through the first channel CH11, and a fourth monitor node 200-4 may communicate with the second wireless communication unit 120 of the manager node 100 through the second channel CH17. Also, the manager node 100 may generate channel setting information so that another channel is used during the second sub transmission slot T-Slot2. As in FIG. 4, the manager node 100 may generate channel setting information so that the first channel CH11 and the second channel CH17 are used during the first sub transmission slot T-Slot1 and the third channel CH13 and the fourth channel CH19 are used during the second sub transmission slot T-Slot2.

The reason that different channels are used during the second sub transmission slot T-Slot2 is for preventing a case where transmission of battery data fails due to interference occurring in the first channel CH11 and the second channel CH17 used during the first sub transmission slot T-Slot1. That is, a monitor node 200-N which fails in transmitting battery data due to interference during the first sub transmission slot T-Slot1 may change a wireless channel and then may retransmit the battery data to the manager node 100.

In a case which is assigned to a dedicated slot as in FIG. 4, a monitor node 200-N may transmit battery data to the manager node 100 during a first-sequence dedicated slot, and when the transmission of the battery data fails, the monitor node 200-N may retransmit the battery data to the manager node 100 during a next-sequence dedicated slot. For example, the monitor node #1 200-1 may transmit battery data to the manager node 100 during the first dedicated slot 41, and when the transmission of the battery data fails, the monitor node #1 200-1 may retransmit the battery data to the manager node 100 during the second dedicated slot 42. Also, when the transmission of the battery data fails during the second dedicated slot 42, the monitor node #1 200-1 may third transmit the battery data to the manager node 100 during the seventh dedicated slot 47.

A length of the first sub transmission slot T-Slot1 may be the same as that of the second sub transmission slot T-Slot2.

Figure 5:
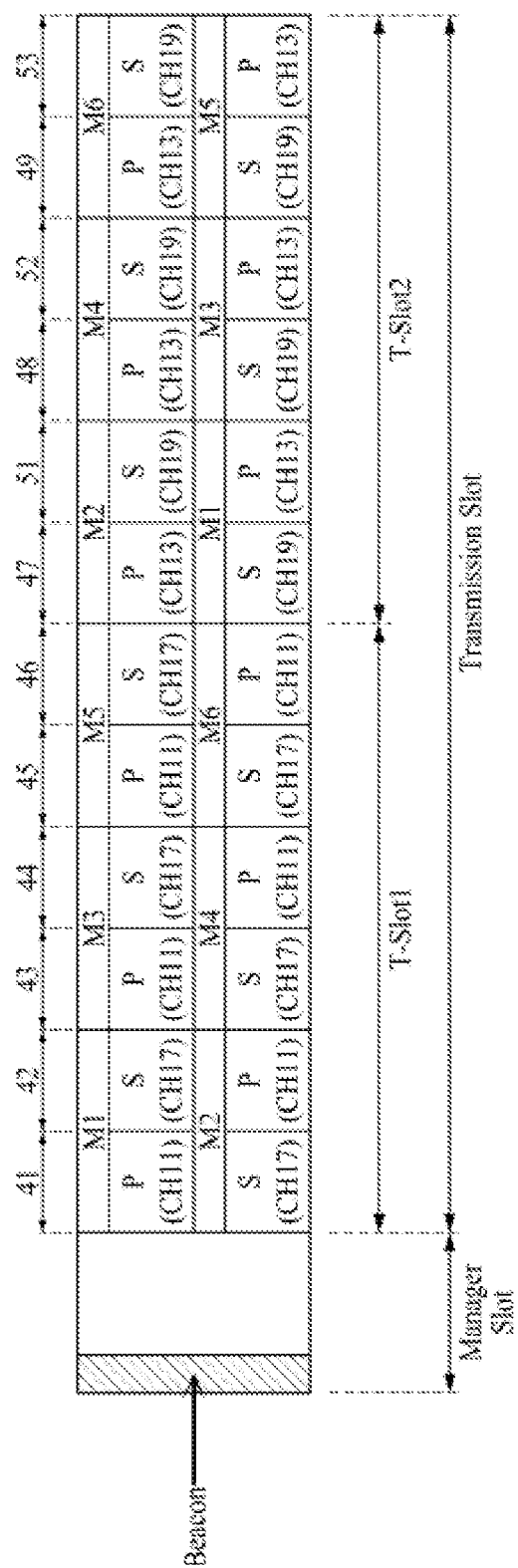
FIG. 5 is another example of a data frame with a dedicated slot assigned thereto.

FIG. 5 is another example of a data frame with a dedicated slot assigned thereto.

In the data frame illustrated in FIG. 4, a length of a first sub transmission slot T-Slot1 may be longer than that of a second sub transmission slot T-Slot2. On the other hand, in the data frame illustrated in FIG. 5, a length of a first sub transmission slot T-Slot1 may be the same as that of a second sub transmission slot T-Slot2.

As illustrated in FIG. 5, a manager node 100 may divide the first sub transmission slot T-Slot1 into six slots to generate six dedicated slots 41 to 46. Also, a manager node 100 may divide the second sub transmission slot T-Slot2 into six slots to generate six dedicated slots 47 to 49 and 51 to 53. In the dedicated slots 47 to 49 and 51 to 53 included in the second sub transmission slot T-Slot2, the manager node 100 may assign a seventh dedicated slot 47 and a tenth dedicated slot 51 to a first group, assign an eighth dedicated slot 48 and an eleventh dedicated slot 52 to a second group, and assign a ninth dedicated slot 49 and a twelfth dedicated slot 53 to a third group. In a case where the data frame of FIG. 5 is used, when transmission of battery data fails, a monitor node 200-N may retransmit the battery data to the manager node 100 a total of three times.

Figure 6:
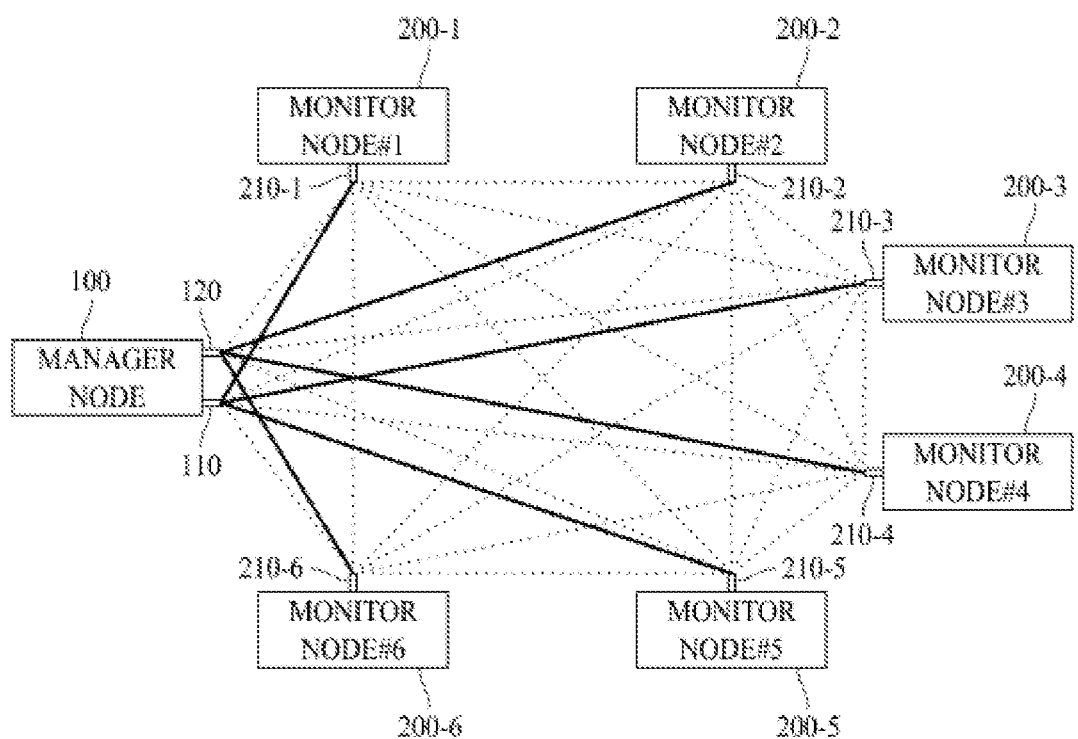
FIG. 6 is a diagram illustrating a wireless link formed at a first dedicated slot timing of each group.

FIG. 6 is a diagram illustrating a wireless link formed at a first dedicated slot timing of each group.

Figure 7:
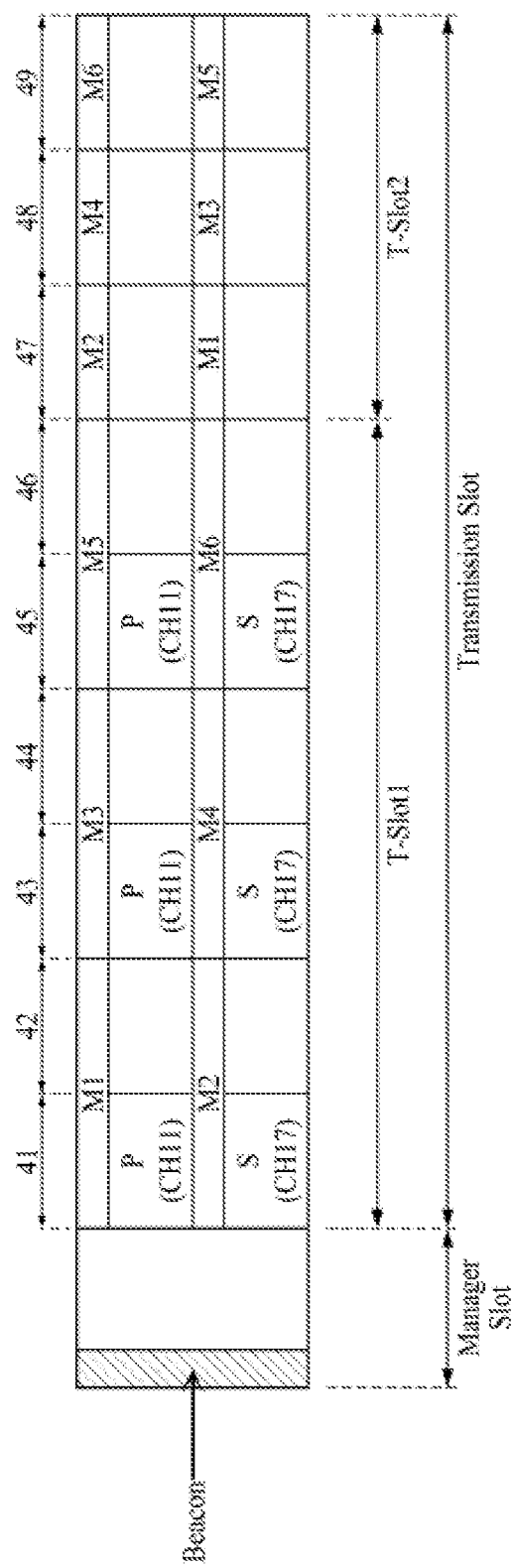
FIG. 7 is a diagram illustrating a channel used at a first-sequence dedicated slot timing of each group.

FIG. 7 is a diagram illustrating a channel used at a first-sequence dedicated slot timing of each group.

Referring to FIGS. 6 and 7, a manager node 100 may set a communication channel of a first wireless communication unit 110 and a second wireless communication unit 120 as channels used in a first sub transmission slot T-Slot1. That is, the manager node 100 may set the communication channel of the first wireless communication unit 110 to a first channel CH11 and may set the communication channel of the second wireless communication unit 120 to a second channel CH17. Also, each monitor node 200-N may check identification information (i.e., identification information about a main channel) about a channel used in a first-sequence dedicated slot among dedicated slots assigned thereto and may set a communication channel of a wireless communication unit 210-N as a channel corresponding to the identification information about the channel. That is, a monitor node #1 200-1, a monitor node #3 200-3, and a monitor node #5 200-5 may respectively set communication channels of wireless communication units 210-1, 210-3, and 210-5 to the first channel CH11 to communicate with the first wireless communication unit 110 of the manager node 100, and a monitor node #2 200-2, a monitor node #4 200-4, and a monitor node #6 200-6 may respectively set communication channels of wireless communication units 210-2, 210-4, and 210-6 to the second channel CH12 to communicate with the second wireless communication unit 120 of the manager node 100.

In a state where a communication channel is set, the monitor node #1 200-1 may transmit first battery data to the manager node 100 during a first dedicated slot 41 by using a wireless communication unit #1 210-1 set to the first channel CH11, and the monitor node #2 200-2 may transmit second battery data to the manager node 100 during the first dedicated slot 41 by using a wireless communication unit #2 210-2 set to the second channel CH17. Likewise, the monitor node #3 200-3 may transmit third battery data to the manager node 100 during a third dedicated slot 43 by using a wireless communication unit #3 210-3 set to the first channel CH11, and the monitor node #4 200-4 may transmit fourth battery data to the manager node 100 during the third dedicated slot 43 by using a wireless communication unit #4 210-4 set to the second channel CH17. Also, the monitor node #5 200-5 may transmit fifth battery data to the manager node 100 during a fifth dedicated slot 45 by using a wireless communication unit #5 210-5 set to the first channel CH11, and the monitor node #6 200-6 may transmit sixth battery data to the manager node 100 during the fifth dedicated slot 45 by using a wireless communication unit #6 210-6 set to the second channel CH17.

By using the first wireless communication unit 110 set to the first channel CH11 and the second wireless communication unit 120 set to the second channel CH17, the manager node 100 may simultaneously collect the first battery data and the second battery data during the first dedicated slot 41, simultaneously collect the third battery data and the fourth battery data during the third dedicated slot 43, and simultaneously collect the fifth battery data and the sixth battery data during the fifth dedicated slot 45.

Transmission of one or more of such pieces of battery data may fail.

In this case, each monitor node 200-N may retransmit battery data by using a next-sequence dedicated slot among dedicated slots assigned thereto.

Figure 8:
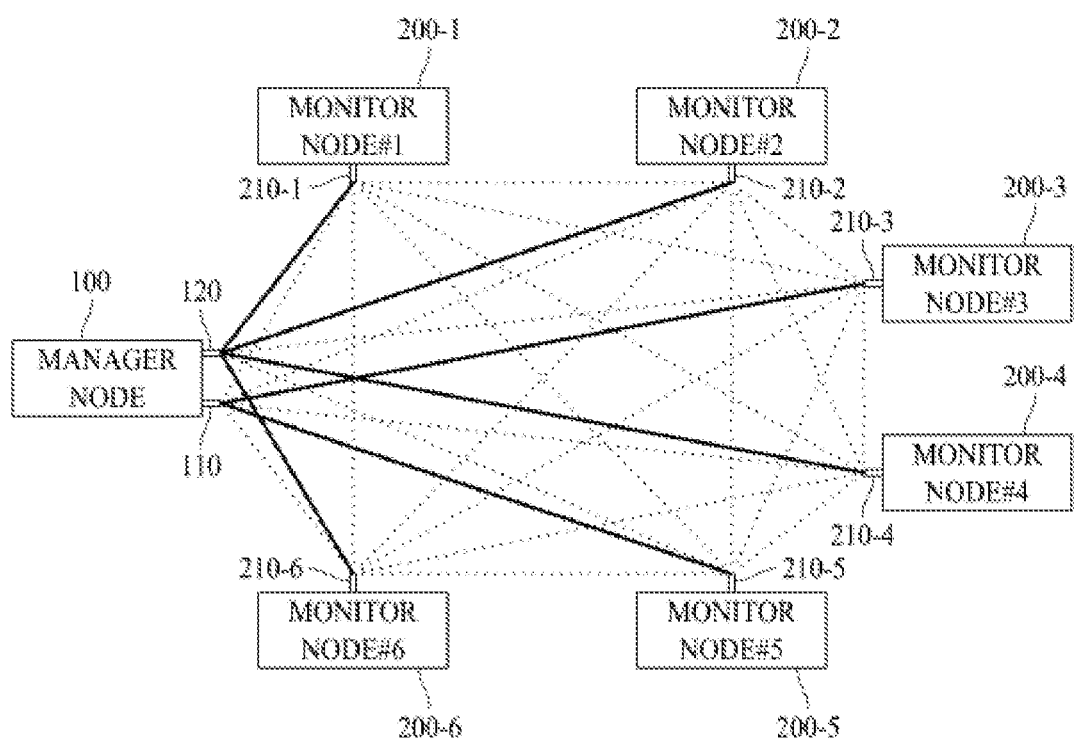
FIG. 8 is a diagram illustrating a wireless link formed based on a failure of transmission of battery data.

FIG. 8 is a diagram illustrating a wireless link formed based on a failure of transmission of battery data.

Figure 9:
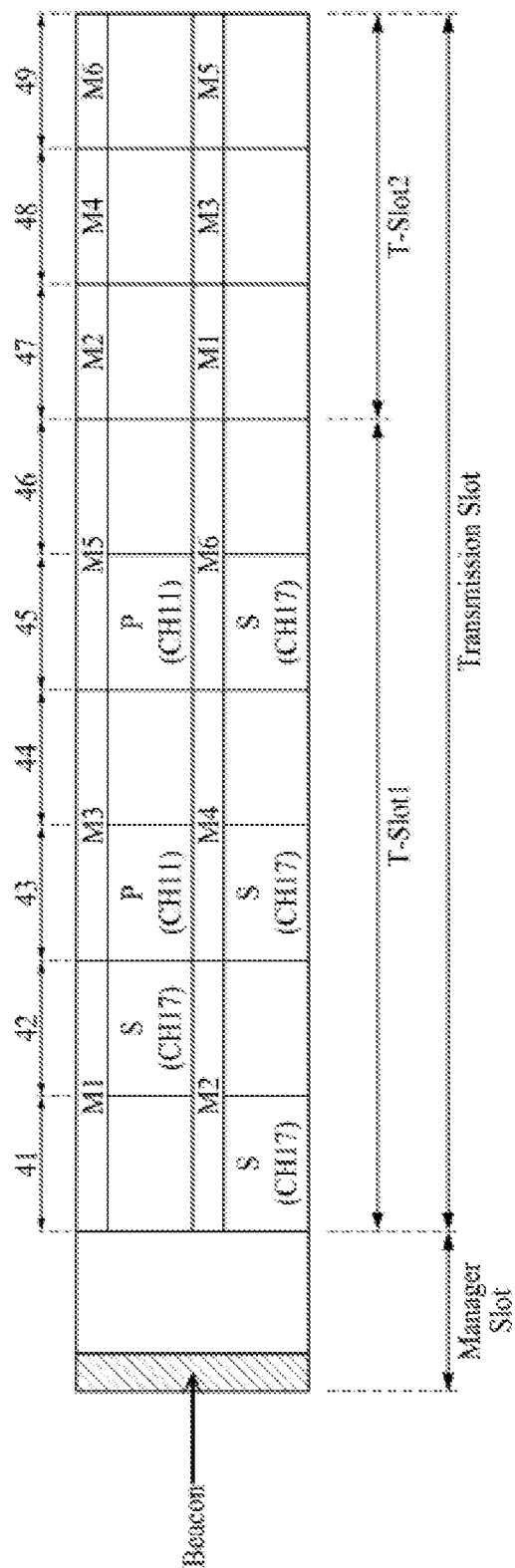
FIG. 9 is a diagram illustrating a data frame occurring when transmission of data fails first.

FIG. 9 is a diagram illustrating a data frame occurring when transmission of data fails first.

Referring to FIGS. 8 and 9, when a monitor node #1 200-1 fails in transmitting first battery data to a manager node 100 during a first dedicated slot 41, the monitor node #1 200-1 may change a communication channel of a wireless communication unit #1 210-1 from a first channel CH11 to a second channel CH17 to form a wireless link along with a second wireless communication unit 120 of the manager node 100. The monitor node #1 200-1 may transmit the first battery data to the manager node 100, but when acknowledge (ACK) is not received from the manager node 100 for a predetermined time, the monitor node #1 200-1 may determine that transmission of data fails. The monitor node #1 200-1 where a communication channel is changed may transmit the first battery data to the manager node 100 during a second dedicated slot 42. At this time, the first battery data may be transmitted to the second wireless communication unit 120 of the manager node 100. In the data frame of FIG. 9, a state where the first battery data is retransmitted to the manager node 100 during the second dedicated slot 42 is illustrated. Transmission of battery data from a monitor node 200-N to the manager node 100 and transmission of an ACK message from the manager node 100 to the monitor node 200-N may all be performed during one dedicated slot.

The monitor node #1 200-1 may fail in transmitting the first battery data during the second dedicated slot 42.

Figure 10:
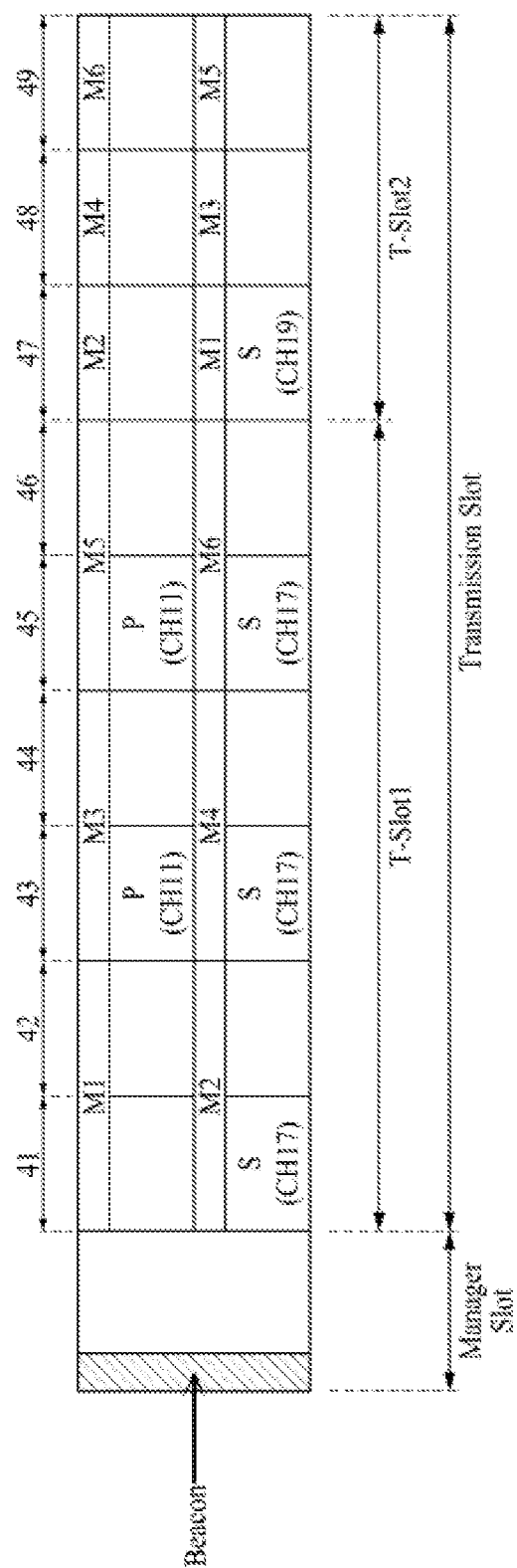
FIG. 10 is a diagram illustrating a data frame occurring when transmission of data fails second.

FIG. 10 is a diagram illustrating a data frame occurring when transmission of data fails second.

When a monitor node #1 200-1 fails in transmitting first battery data during a second dedicated slot 42, the monitor node #1 200-1 may change a communication channel of a wireless communication unit #1 210-1 from a second channel CH17 to a first channel CH11 to form a wireless link along with a second wireless communication unit 120 of a manager node 100. As illustrated in FIG. 10, the monitor node #1 200-1 may retransmit the first battery data to the manager node 100 during a seventh dedicated slot 47. The first battery data may be transmitted through a fourth channel CH19 formed between the wireless communication unit #1 210-1 of the monitor node #1 200-1 and the second wireless communication unit 120 of the manager node 100.

Moreover, in a case where four dedicated slots are assigned to a monitor node as in FIG. 5, when the monitor node #1 200-1 fails in transmitting the first battery data during a third-sequence dedicated slot (i.e., the seventh dedicated slot 47), the monitor node #1 200-1 may retransmit the first battery data to the manager node 100 during a fourth-sequence tenth dedicated slot 51.

Figure 11:
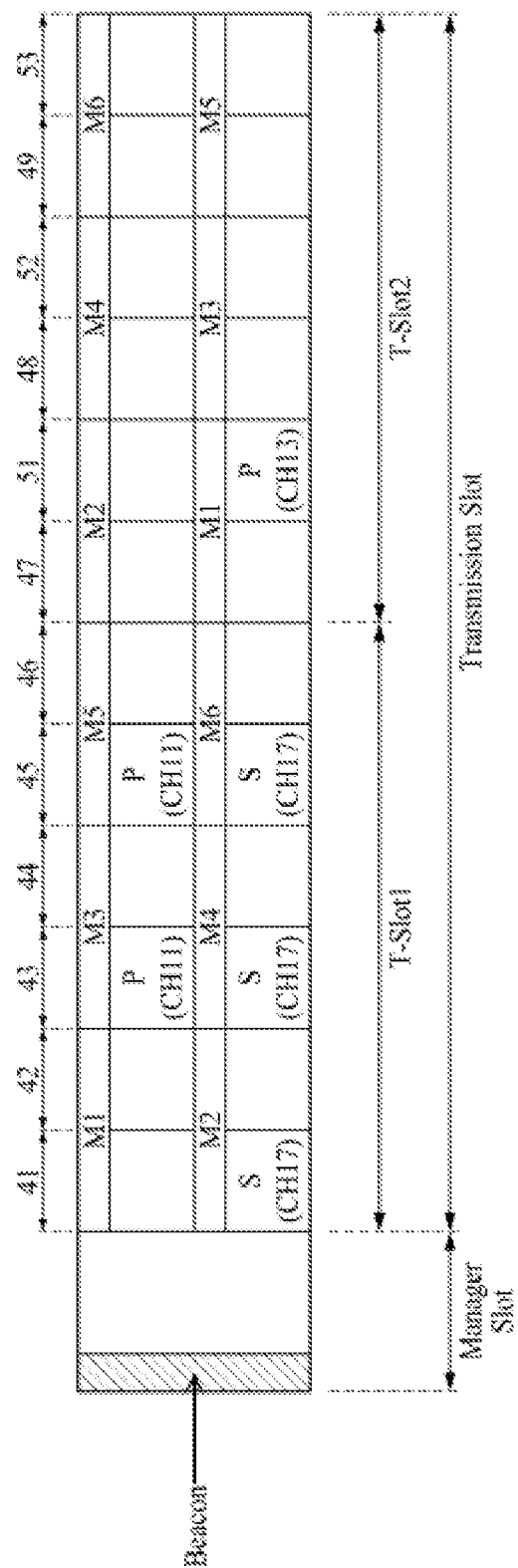
FIG. 11 is a diagram illustrating a data frame occurring when transmission of data fails third.

FIG. 11 is a diagram illustrating a data frame occurring when transmission of data fails third.

When a monitor node #1 200-1 fails in transmitting first battery data during a seventh dedicated slot 47, the monitor node #1 200-1 may change a communication channel of a wireless communication unit #1 210-1 from a fourth channel CH19 to a third channel CH13 to form a wireless link along with a first wireless communication unit 110 of a manager node 100. As illustrated in FIG. 11, the monitor node #1 200-1 may retransmit the first battery data to the manager node 100 during a tenth dedicated slot 51.

As described above, monitor nodes 200-N which are included in the same group and share a dedicated slot may communicate with a manager node 100 through different channels at the same transmission timing (i.e., the dedicated slot). Also, when each monitor node 200-N fails in transmitting battery data during an $N^{th}$-sequence (where N is a natural number) dedicated slot among dedicated slots assigned thereto, each monitor node 200-N may change a communication channel and may retransmit the battery data to the manager node 100 during the $(N+1)^{th}$-sequence dedicated slot.

Figure 12:
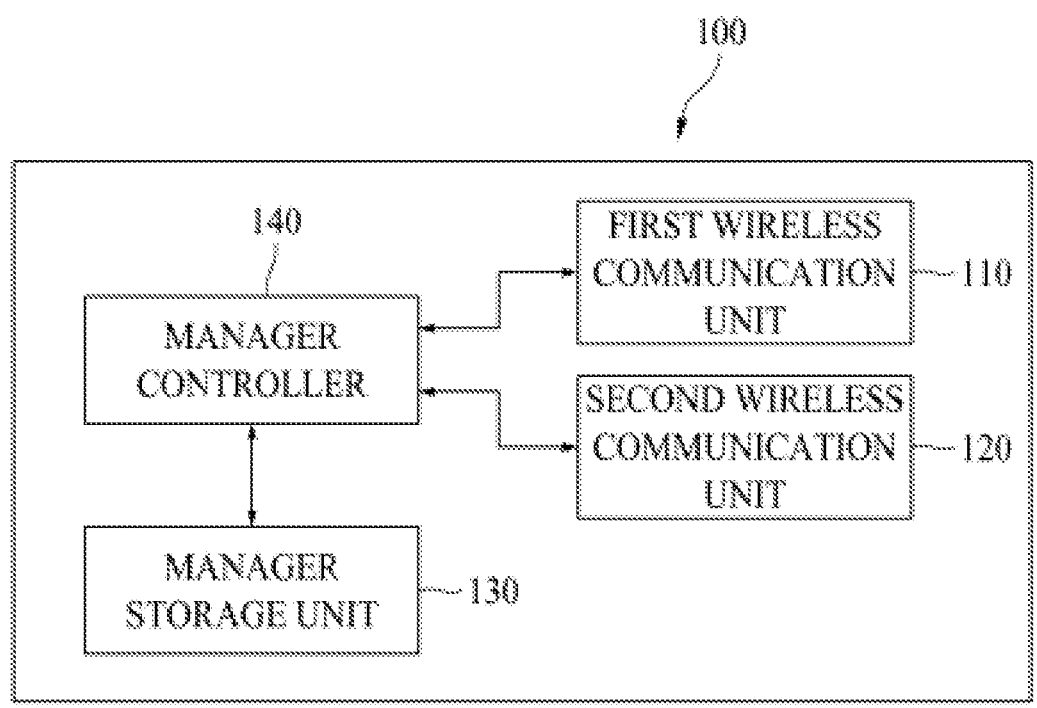
FIG. 12 is a diagram illustrating a configuration of a manager node according to an embodiment of the present disclosure.

FIG. 12 is a diagram illustrating a configuration of a manager node according to an embodiment of the present disclosure.

As illustrated in FIG. 12, the manager node 100 according to an embodiment of the present disclosure may include a first wireless communication unit 110, a second wireless communication unit 120, a manager storage unit 130, and a manager controller 140.

A first wireless communication unit 110 may communicate with a monitor node 200-N through a specific channel.

A second wireless communication unit 120 may communicate with a monitor node 200-N through a channel which differs from a communication channel of the first wireless communication unit 110.

The first wireless communication unit 110 and the second wireless communication unit 120 may each include a radio frequency (RF) circuit for performing short-range wireless communication. Also, each of the first wireless communication unit 110 and the second wireless communication unit 120 may broadcast a beacon at a certain periodic interval. A transmission timing of a beacon transmitted by the first wireless communication unit 110 may be the same as or different from a transmission timing of a beacon transmitted by the second wireless communication unit 120.

The manager storage unit 130 may be a storage means such as a memory or a disk device and may store various programs and data for operating the manager node 100. Particularly, the manager storage unit 130 may store a program (or an instruction set) where an algorithm for executing an operation of the manager node 100 described above is defined. Also, the manager storage unit 130 may store battery data received from each of a plurality of monitor nodes 200-N. The manager storage unit 130 may store a join list.

The manager controller 140, as an operation processing device such as a microprocessor, may control an overall operation of the manager node 100 and may generate data for controlling the monitor nodes 200-N. The manager controller 140 may install data, associated with the program (or the instruction set) stored in the manager storage unit 130, in a memory and may perform wireless communication and slot assignment operation according to an embodiment of the present disclosure.

The manager controller 140 may obtain the battery data of each monitor nodes 200-N by using the first wireless communication unit 110 or the second wireless communication unit 120 and may analyze the battery data to check states of battery modules including the monitor node 200-N. Also, the manager controller 140 may overall analyze the battery data to check a state of a battery pack and may control charging and discharging, based thereon.

By using all of the first wireless communication unit 110 and the second wireless communication unit 120, a manager controller 140 may receive a plurality of battery data from a plurality of monitor nodes 200-N. The manager controller 140 may set a communication channel of the first wireless communication unit 110 to a first channel CH11 and may set a communication channel of the second wireless communication unit 120 to a second channel CH17, and then, may receive battery data from a monitor node 200-N by using all of the first channel CH11 and the second channel CH17 during a first sub transmission slot T-Slot1. Also, the manager controller 140 may set the communication channel of the first wireless communication unit 110 to a third channel CH13 and may set the communication channel of the second wireless communication unit 120 to a fourth channel CH19, and then, may receive battery data from a monitor node 200-N through one or more of the third channel CH13 and the fourth channel CH19 during a second sub transmission slot T-Slot2. Battery data received through the third channel or the fourth channel may be data which fails in reception during the first sub transmission slot T-Slot1.

Moreover, the manager controller 140 may group monitor nodes 200-N into a plurality of groups, assign a dedicated slot for each of the groups during the first sub transmission slot T-Slot1, and assign a dedicated slot for each of the groups during the second sub transmission slot T-Slot2. The manager controller 140 may generate setting information about a channel used for each dedicated slot. The manager controller 140 may generate assignment information including information about a dedicated slot assigned to a corresponding monitor node 200-N and channel setting information about the dedicated slot and may transmit the assignment information to the corresponding monitor node 200-N by using one or more of the first wireless communication unit 110 and the second wireless communication unit 120.

Figure 13:
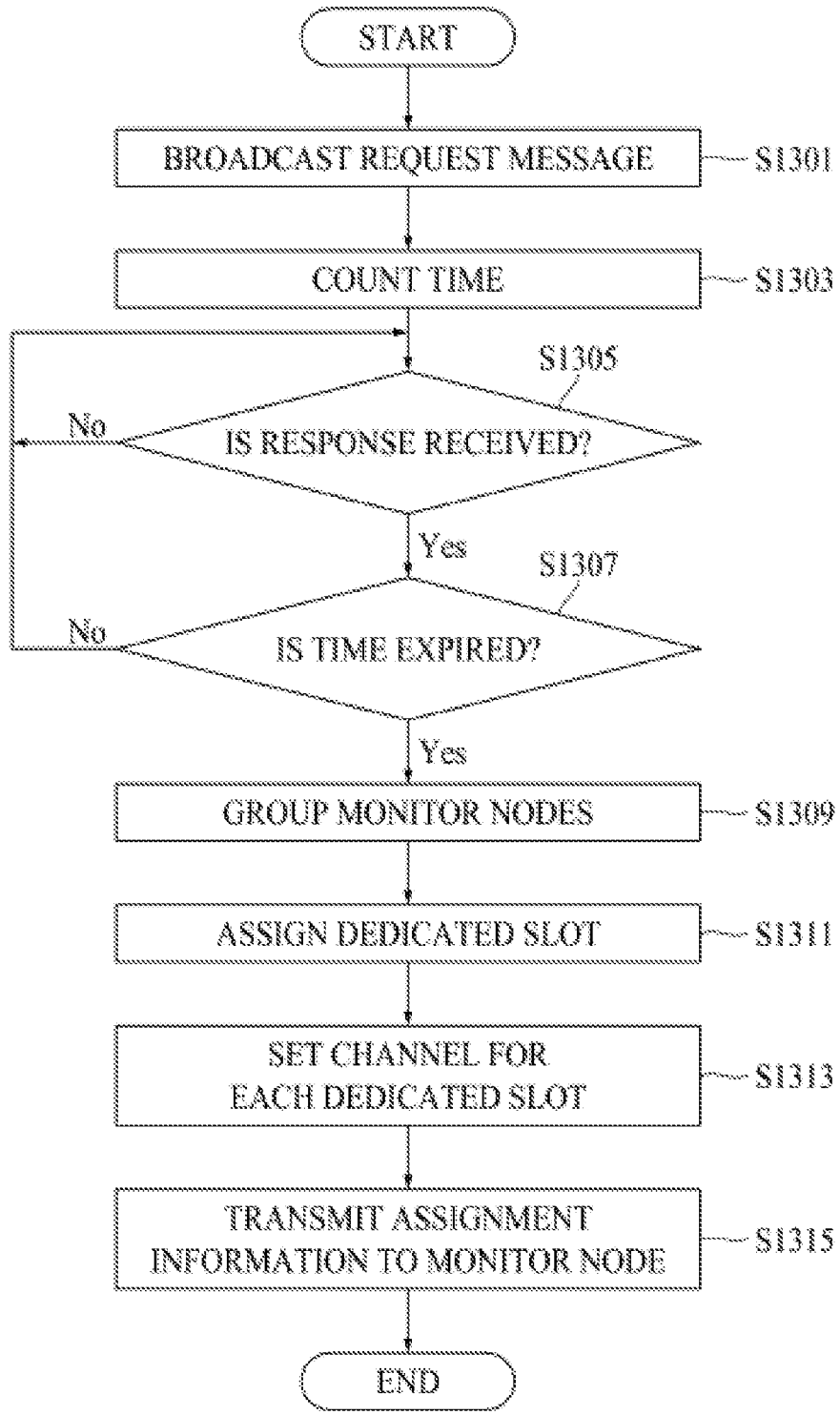
FIG. 13 is a flowchart describing a method of assigning a dedicated slot by using a manager node, according to an embodiment of the present disclosure.

FIG. 13 is a flowchart describing a method of assigning a dedicated slot by using a manager node, according to an embodiment of the present disclosure.

Referring to FIG. 13, when a network is initially set, the manager controller 140 may broadcast a message for issuing a request to join in the network and requesting identification information by using one or more of the first wireless communication unit 110 and the second wireless communication unit 120 in operation S1310. Also, the manager controller 140 may start to count a time in operations S1303. The manager node 100 may broadcast the message during a manager slot.

Subsequently, in operation S1305, the manager controller 140 may monitor whether the first wireless communication unit 110 and the second wireless communication unit 120 receive a join response from each monitor node 200-N. When the join response is received, the manager controller 140 may check identification information (for example, an MAC address) about a corresponding monitor node 200-N and may record the identification information about the corresponding monitor node 200-N in a join list of a manager storage unit 130.

The manager controller 140 may check whether a counted time reaches a predetermined expiration time, and when the counted time does not reach the predetermined expiration time in operation S1307 (No), the manager controller 140 may again perform operation S1305 to stand by the reception of a response.

On the other hand, when the counted time reaches the predetermined expiration time in operation S1307 (Yes), the manager controller 140 may check the number of monitor nodes recorded in the join list to check the number of monitor nodes 200-N joining in a short-range wireless network. Also, in operation S1309, the manager controller 140 may group monitor nodes to generate a plurality of groups including a number of elements equal to the number (for example, two) of wireless communication units 110 and 120. The manager controller 140 may group monitor nodes 200-N into a plurality of groups randomly or in the order in which join responses are received.

Subsequently, in operation S1311, the manager controller 140 may assign a group-based dedicated slot in a first sub transmission slot T-Slot1 and may assign a group-based dedicated slot in a second sub transmission slot T-Slot2. The manager controller 140 may divide the first sub transmission slot T-Slot1 into slots equal to a number obtained by multiplying the number of groups and the number of wireless communication units 110 and 120 to generate a plurality of dedicated slots and may equally and respectively assign the plurality of dedicated slots to the groups. Also, the manager controller 140 may divide the second sub transmission slot T-Slot2 into slots equal to the number of groups to generate a plurality of dedicated slots and may individually assign each of the plurality of dedicated slots to a corresponding group of the groups. In another embodiment, like dividing the first sub transmission slot T-Slot1, the manager controller 140 may divide the second sub transmission slot T-Slot2 into slots equal to a number obtained through the multiplication to generate a plurality of dedicated slots and may equally and respectively assign the plurality of dedicated slots to the groups.

Moreover, in operation S1313, the manager controller 140 may set a channel for each dedicated slot so that monitor nodes included in the same group communicate with one of the first wireless communication unit 110 and the second wireless communication unit 120 by using different channels at the same transmission timing (i.e., during the same transmission slot).

Subsequently, in operation S1315, the manager controller 140 may generate assignment information including assigned dedicated slot information (for example, a start point and an end point) and channel setting information about each dedicated slot, for each monitor node and may transmit the assignment information to a corresponding monitor node 200-N.

The manager node 100 may communicate with a monitor node 200-N by using a predetermined default channel until before a communication channel of each dedicated slot is set. That is, the manager controller 140 may set a communication channel of the first wireless communication unit 110 or a communication channel of the second wireless communication unit 120 to the predetermined default channel and may communicate with the monitor node 200-N to transmit or receive a request message, a join response, and assignment information. Also, after the assignment information is transmitted, the manager controller 140 may set the communication channel of the first wireless communication unit 110 to a first channel and may set the communication channel of the second wireless communication unit 120 to a second channel. A default channel of the first wireless communication unit 110 may be the first channel, and a default channel of the second wireless communication unit 120 may be the second channel. Also, a default channel of the monitor node 200-N may be one of the first channel and the second channel.

According to an embodiment, when a time corresponding to the second sub transmission slot T-Slot2 arrives, the manager controller 140 may change the communication channel of the first wireless communication unit 110 from the first channel to a third channel and may change the communication channel of the second wireless communication unit 120 from the second channel to a fourth channel. Also, in an embodiment, when a time corresponding to the first sub transmission slot T-Slot1 arrives, the manager controller 140 may change the communication channel of the first wireless communication unit 110 to the first channel and may change the communication channel of the second wireless communication unit 120 to the second channel. That is, according to an embodiment, as a period corresponding to the first sub transmission slot T-Slot1 and a period corresponding to the second sub transmission slot T-Slot2 arrive, the manager controller 140 may alternately set the communication channel of the first wireless communication unit 110 to the first channel and the third channel and may alternately set the communication channel of the second wireless communication unit 120 to the second channel and the fourth channel.

In another embodiment, only when omission of data occurs (i.e., the non-reception of battery data), the manager controller 140 may selectively change the communication channel of the first wireless communication unit 110 or the communication channel of the second wireless communication unit 120 during the second sub transmission slot T-Slot2.

Figure 14:
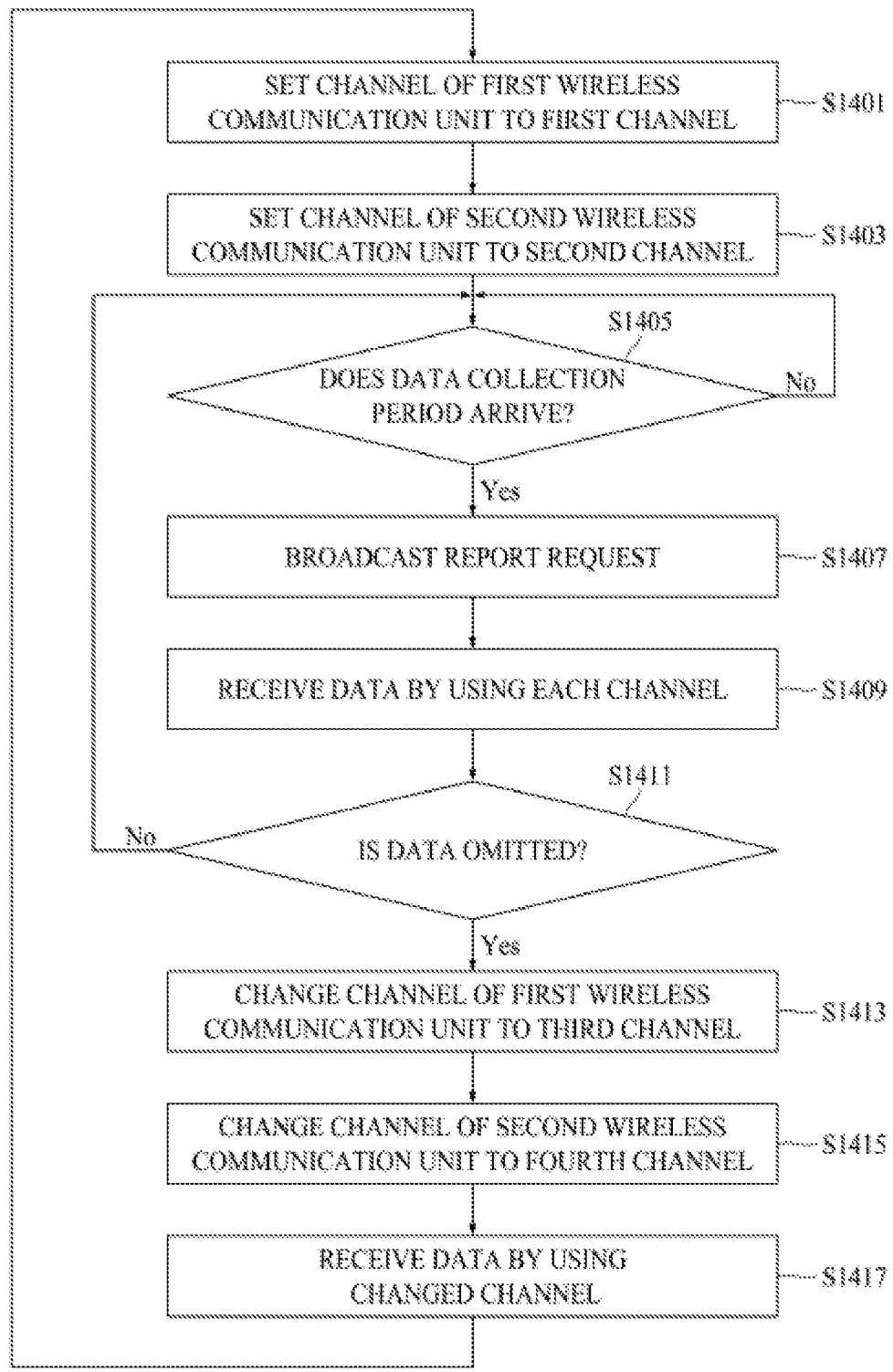
FIG. 14 is a flowchart describing a method of changing a channel on the basis of omission of data by using a manager node, according to another embodiment of the present disclosure.

FIG. 14 is a flowchart describing a method of changing a channel on the basis of omission of data by using a manager node, according to another embodiment of the present disclosure.

Referring to FIG. 14, in operations S1401 and S1403, a manager controller 140 may initially set a communication channel of a first wireless communication unit 110 to a first channel and may set a communication channel of a second wireless communication unit 120 to a second channel. Subsequently, the manager controller 140 may check whether a data collection period arrives, and when the data collection period arrives in operation S1405, the manager controller 140 may broadcast a message, issuing a request to report battery data during a manager slot, to all monitor nodes 200-N in operation S1407. In this case, the manager controller 140 may broadcast the message by using all of the first wireless communication unit 110 and the second wireless communication unit 120.

Subsequently, in operation S1409, the manager controller 140 may receive battery data from each monitor node 200-N through the first channel of the first wireless communication unit 110 and the second channel of the second wireless communication unit 120 during a first sub transmission slot T-Slot1. Subsequently, the manager controller 140 may determine whether battery data is received from all monitor nodes 200-N during the first sub transmission slot T-Slot1. That is, in operation S1411, the manager controller 140 may determine whether the reception of the battery data is omitted during the first sub transmission slot T-Slot1. The manager controller 140 may determine whether battery data is received from all monitor nodes 200-N registered in a join list, and thus, may determine whether omission of data occurs.

When omission of data occurs, the manager controller 140 may change the communication channel of the first wireless communication unit 110 from the first channel to a third channel and may change the communication channel of the second wireless communication unit 120 from the second channel to a fourth channel in operations S1413 and S1415. Also, in operation S1417, the manager controller 140 may receive omitted battery data from a corresponding monitor node 200-N by using one or more of the third channel of the first wireless communication unit 110 and the fourth channel of the second wireless communication unit 120 during a second sub transmission slot T-Slot2. When the second sub transmission slot T-Slot2 elapses, the manager controller 140 may change the communication channel of the first wireless communication unit 110 from the third channel to the first channel and may change the communication channel of the second wireless communication unit 120 from the fourth channel to the second channel, thereby restoring each channel to an original channel.

The method of FIG. 14 described above may correspond to one period, and the manager node 100 may repeatedly perform the method of FIG. 14.

Figure 15:
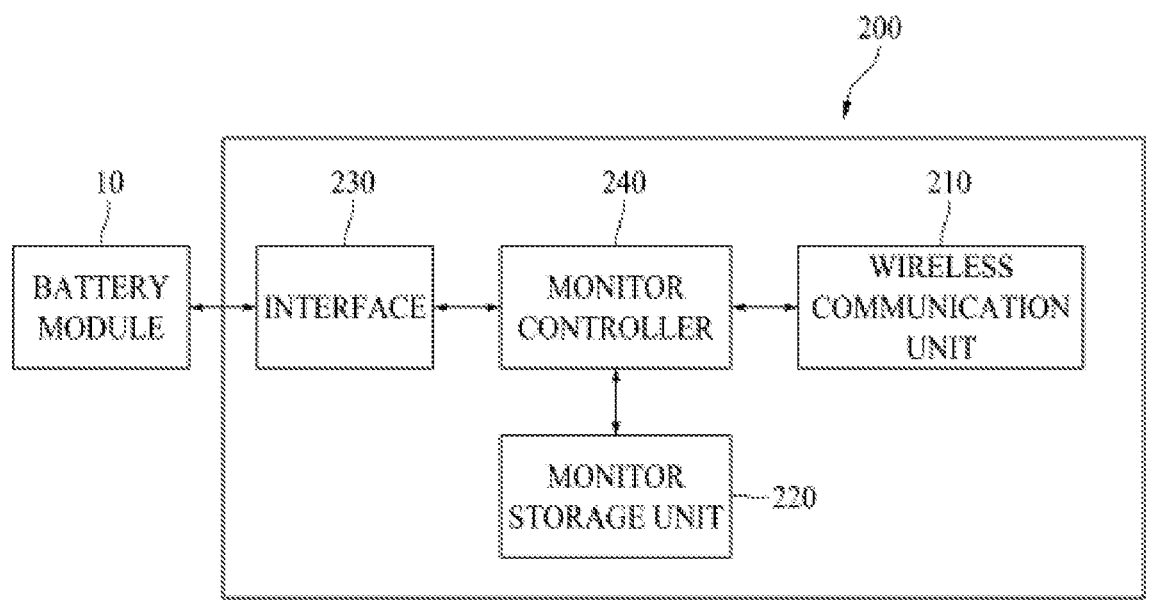
FIG. 15 is a diagram illustrating a configuration of a monitor node according to an embodiment of the present disclosure.

FIG. 15 is a diagram illustrating a configuration of a monitor node according to an embodiment of the present disclosure.

As illustrated in FIG. 15, the monitor node 200 according to an embodiment of the present disclosure may include a wireless communication unit 210, a monitor storage unit 220, an interface 230, and a monitor controller 240.

A wireless communication unit 210 may set a communication channel to a channel corresponding to a frequency of a frequency band and may perform wireless communication with a first wireless communication unit 110 or a second wireless communication unit 120 of a manager node 100. The wireless communication unit 210 may include a radio frequency (RF) circuit for performing short-range wireless communication.

The monitor storage unit 220 may be a storage means such as a memory or a disk device and may store various programs and data for operating the monitor node 200. Particularly, the storage unit 220 may store a program (or an instruction set) where an algorithm for executing an operation of the monitor node 200 described above is defined.

The interface 230 may be an element which supports a communication connection with a battery module 10 equipped with the monitor node 200 and may use a bus cable, a cable, or the like, or may use CAN communication. The monitor node 200 may obtain, through the interface 230, battery data generated in the battery module 10.

The monitor controller 240, as an operation processing device such as a microprocessor, may control an overall operation of the monitor node 200. The monitor controller 240 may install data, associated with the program (or the instruction set) stored in the storage unit 220, in a memory and may perform wireless communication and a channel change operation according to an embodiment of the present disclosure.

The monitor controller 240 may obtain various data such as a temperature, a current, and a voltage of the battery module 10 through the interface 230 and may measure an AFE of the battery module 10 and may inspect a state (i.e., diagnostic test) of the battery module 10. Also, the monitor controller 240 may transmit battery data, including one or more of a current, a voltage, a temperature, and self-diagnosis data, to the manager node 100 by using the wireless communication unit 210.

When a monitor controller 240 receives assignment information from the wireless communication unit 210, the monitor controller 240 may check each dedicated slot information and channel setting information among the assignment information to set a plurality of periods, corresponding to the dedicated slot information, of a transmission slot of a data frame to a dedicated slot and may check a channel used for each dedicated slot on the basis of the channel setting information. Each dedicated slot may be shared by another monitor node of the same group, and the monitor controller 240 may set a communication channel of the wireless communication unit 210 so that a channel differing from the other monitor node is used during a dedicated slot. The monitor controller 240 may check the channel setting information and identification information about a channel (i.e., a main channel) used for a first-sequence dedicated slot among assigned dedicated slots and may initially set a communication channel of the wireless communication unit 210 to correspond to the channel identification information. When the monitor controller 240 fails in transmitting the battery data during an $N^{th}$-sequence dedicated slot, the monitor controller 240 may check channel identification information used for an $(N+1)^{th}$-sequence dedicated slot among the channel setting information, change the communication channel of the wireless communication unit 210 to correspond to the channel identification information, and retransmit the battery data to the manager node 100 by using the wireless communication unit 210 during the $(N+1)^{th}$-sequence dedicated slot.

The wireless communication unit 210 may use a predetermined default channel as a communication channel until before the assignment information is received. In this case, the monitor controller 240 may receive a request message and assignment information from the manager node 100 by using the wireless communication unit 210 set to the default channel and may transmit a join response to the manager node 100. The default channel of the wireless communication unit 210 may be the first channel or the second channel.

Figure 16:
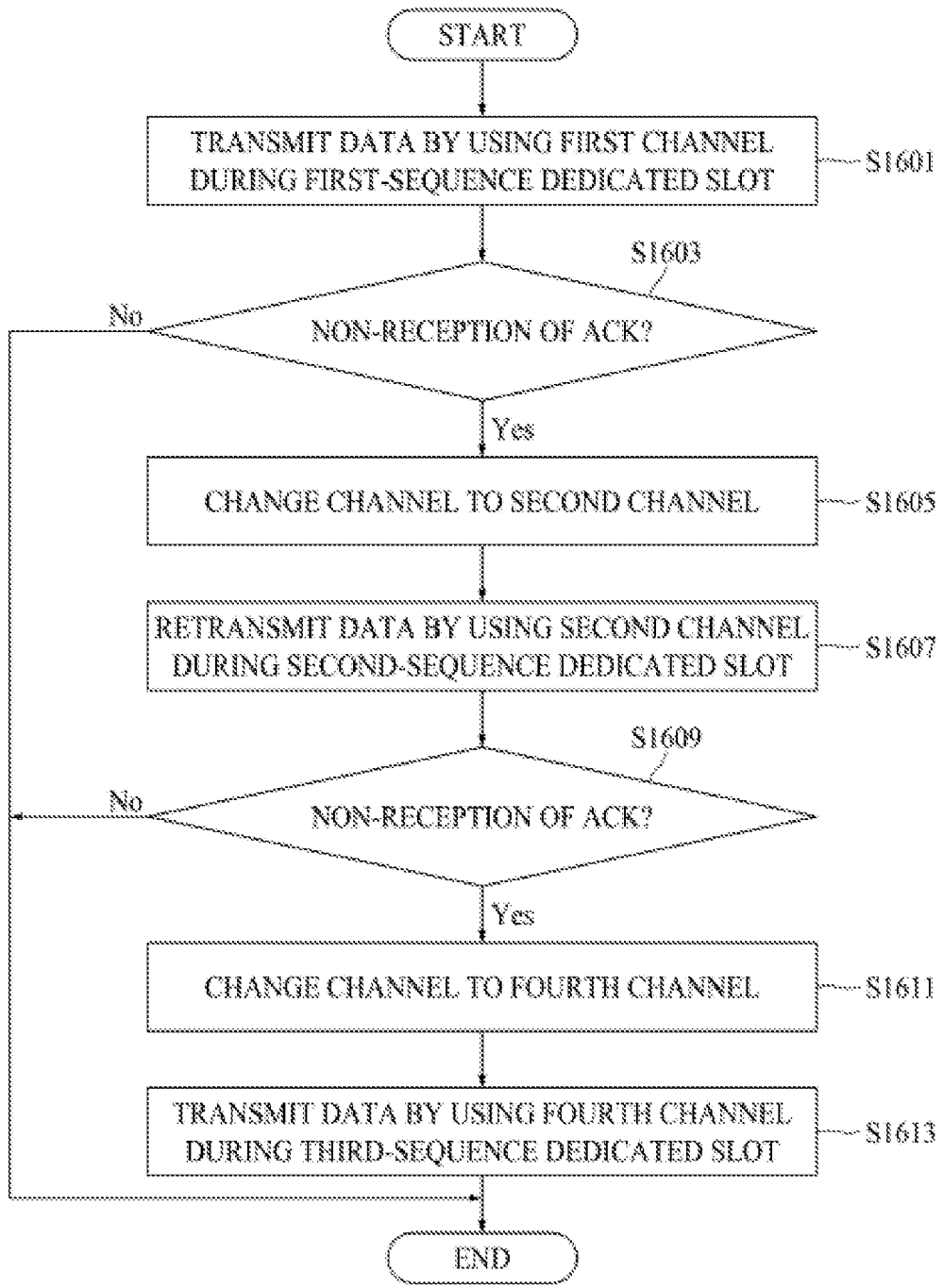
FIG. 16 is a flowchart describing a method of transmitting battery data by using a monitor node, according to an embodiment of the present disclosure.

FIG. 16 is a flowchart describing a method of transmitting battery data by using a monitor node, according to an embodiment of the present disclosure.

Referring to FIG. 16, when the wireless communication unit 210 receives assignment information from the manager node 100, the monitor controller 240 may check each dedicated slot information and channel setting information among the assignment information. The monitor controller 240 may set a plurality of periods, corresponding to the dedicated slot information, of a transmission slot of a data frame to a dedicated slot of the monitor node 200. A plurality of dedicated slots set by the monitor controller 240 may be shared by another monitor node of the same group. Also, the monitor controller 240 may check a channel used for each dedicated slot on the basis of the channel setting information and may set a channel, used during a first-sequence dedicated slot, to a communication channel of the wireless communication unit 210. In description given with reference to FIG. 16, as in FIGS. 4, 7, 9, and 10, it is described that the monitor controller 240 assigns a dedicated slot of the monitor node 200 in the order of the first dedicated slot 41, the second dedicated slot 42, and the seventh dedicated slot 47 in a data frame, uses the first channel CH11 during the first dedicated slot, uses the second channel CH17 during the second dedicated slot, and uses the fourth channel CH19 during the seventh dedicated slot.

When the wireless communication unit 210 receives a message, issuing a request to report data, from the manager node 100, the monitor controller 240 may check collected battery data by using the interface 230 and may transmit the battery data to the manager node 100 through the first channel formed between the wireless communication unit 210 and the first wireless communication unit 110 of the manager node 100 during a first-sequence dedicated slot (for example, the first dedicated slot) in operation S1601. The first dedicated slot may be shared by another monitor node of the same group, and the wireless communication unit 210 may communicate with the manager node 100 by using the first channel CH11 which differs from the second channel CH17 formed in the other monitor node.

Subsequently, in operation S1603, the monitor controller 240 may check whether the wireless communication unit 210 receives ACK. That is, the monitor controller 240 may check whether the wireless communication unit 210 receives the ACK representing that the battery data is normally received.

When the ACK is not received for a certain time, the monitor controller 240 may check a channel (for example, the second channel) used for a second-sequence dedicated slot (for example, the second dedicated slot) and may change a communication channel of the wireless communication unit 210 from the first channel CH11 to the second channel CH17 in operation S1605. Also, the monitor controller 240 may retransmit the battery data to the manager node 100 through the second channel formed between the wireless communication unit 210 and the second wireless communication unit 120 of the manager node 100 during the second-sequence dedicated slot (for example, the second dedicated slot) in operation S1607.

Subsequently, in operation S1609, the monitor controller 240 may check whether the wireless communication unit 210 receives the ACK representing that the battery data is normally received. When the ACK is not received for a certain time, the monitor controller 240 may check a channel (for example, the fourth channel) used for the third-sequence dedicated slot (for example, the seventh dedicated slot) and may change the communication channel of the wireless communication unit 210 from the second channel to the fourth channel in operation S1611. Also, the monitor controller 240 may again retransmit the battery data to the manager node 100 through the fourth channel formed between the wireless communication unit 210 and the second wireless communication unit 120 of the manager node 100 during a third-sequence dedicated slot (for example, the seventh dedicated slot) in operation S1613.

When the monitor controller 240 fails in transmitting battery data during a last-sequence dedicated slot, the monitor controller 240 may output an error message to request the inspection of a battery management system from a manager.

The method of FIG. 16 may correspond to one period, and the monitor node 200 may repeatedly perform a procedure of FIG. 16 whenever transmitting battery data.

According to the embodiments of the present disclosure, monitor nodes set as a group may simultaneously communicate with a manager node by using different channels during a dedicated slot shared by the monitor nodes, thereby increasing the availability of wireless channels.

Moreover, according to the embodiments of the present disclosure, a plurality of dedicated slots may be assigned to a monitor node, and then, when the monitor node fails in transmission of battery data during a first dedicated slot, the monitor node may change a channel and then may transmit the battery data to a manager node during a second dedicated slot, thereby preventing the omission of data and supporting stable wireless communication.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure.

All of the disclosed methods and procedures described in this disclosure can be implemented, at least in part, using one or more computer programs or components. These components may be provided as a series of computer instructions on any conventional computer readable medium or machine readable medium, including volatile and nonvolatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors or other hardware components which, when executing the series of computer instructions, perform or facilitate the performance of all or part of the disclosed methods and procedures.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A wireless battery management system comprising:
a manager node obtaining battery data from a plurality of monitor nodes by using a first channel and a second channel which are communication channels based on wireless communication;
a first monitor node collecting first battery data and transmitting the first battery data to the manager node through the first channel during a first dedicated slot; and
a second monitor node collecting second battery data and transmitting the second battery data to the manager node through the second channel during the first dedicated slot.

2. The wireless battery management system of claim 1, wherein,
when the transmission based on the first channel fails, the first monitor node changes a communication channel to the second channel and retransmits the first battery data to the manager node through the second channel during a second dedicated slot, and
when the transmission based on the second channel fails, the second monitor node changes a communication channel to the first channel and retransmits the second battery data to the manager node through the first channel during the second dedicated slot.

3. The wireless battery management system of claim 2, wherein,
when the transmission based on the second channel fails, the first monitor node changes a communication channel to a fourth channel and retransmits the first battery data to the manager node through the fourth channel during a third dedicated slot, and
when the transmission based on the first channel fails, the second monitor node changes a communication channel to a third channel and again retransmits the second battery data to the manager node through the third channel during the third dedicated slot.

4. The wireless battery management system of claim 3, wherein the manager node changes the first channel to the third channel and changes the second channel to the fourth channel.

5. The wireless battery management system of claim 3, wherein the first monitor node and the second monitor node share the first dedicated slot, the second dedicated slot, and the third dedicated slot in a data frame including a plurality of time slots.

6. A manager node comprising:
a first wireless communication unit having a communication channel set to a first channel based on a first frequency;
a second wireless communication unit having a communication channel set to a second channel based on a second frequency; and
a manager controller configured to receive first battery data from a first monitor node using the first wireless communication unit and receive second battery data from a second monitor node using the second wireless communication unit, during a first dedicated slot shared by the first monitor node and the second monitor node.

7. The manager node of claim 6, wherein the manager controller sets the first monitor node and the second monitor node to a group, sets a plurality of dedicated slots shared by the first monitor node and the second monitor node in a data frame having a certain time length, and assigns the set plurality of dedicated slots to the first monitor node and the second monitor node.

8. The manager node of claim 7, wherein the manager controller sets a channel of each dedicated slot for each monitor node so that different channels are used during a dedicated slot shared by the first monitor node and the second monitor node.

9. The manager node of claim 6, wherein,
when the manager controller fails in receiving the first battery data during the first dedicated slot, the manager controller receives the first battery data from the first monitor node by using the second wireless communication unit during a second dedicated slot, and
when the manager controller fails in receiving the second battery data during the first dedicated slot, the manager controller receives the second battery data from the second monitor node by using the first wireless communication unit during the second dedicated slot.

10. The manager node of claim 9, wherein,
when the manager controller fails in receiving the first battery data during the second dedicated slot, the manager controller changes a communication channel of the first wireless communication unit to a third channel and receives the first battery data from the first monitor node by using the first wireless communication unit during a third dedicated slot, and
when the manager controller fails in receiving the second battery data during the second dedicated slot, the manager controller changes a communication channel of the second wireless communication unit to a fourth channel and receives the second battery data from the second monitor node by using the second wireless communication unit during the third dedicated slot.

11. The manager node of claim 10, wherein,
when the manager controller fails in receiving the first battery data during the third dedicated slot, the manager controller receives the first battery data from the first monitor node by using the second wireless communication unit whose the communication channel is changed to the fourth channel during a fourth dedicated slot, and
when the manager controller fails in receiving the second battery data during the third dedicated slot, the manager controller receives the second battery data from the second monitor node by using the first wireless communication unit whose the communication channel is changed to the third channel during the fourth dedicated slot.

12. The manager node of claim 6, wherein the manager controller alternately sets a communication channel of the first wireless communication unit to the first channel and a third channel and alternately sets a communication channel of the second wireless communication unit to the second channel and a fourth channel.

13. A monitor node sharing a dedicated slot with another monitor node, the monitor node comprising:
a wireless communication unit performing wireless communication with a manager node;
an interface connected to a battery module; and
a monitor controller collecting battery data by using the interface, setting a communication channel of the wireless communication unit to a first channel differing from a communication channel of another monitor node during a first dedicated slot shared by the another monitor node, and transmitting the battery data to the manager node through the first channel.

14. The monitor node of claim 13, wherein, when the monitor controller fails in transmitting the battery data through the first channel, the monitor controller changes the communication channel of the wireless communication unit from the first channel to a second channel and retransmits the battery data to the manager node through the second channel during a second dedicated slot.

15. The monitor node of claim 13, wherein the monitor controller collects the battery data including one or more of a temperature, a current, a voltage, and diagnostic data of the battery module.

* * * * *